Feb. 11, 1930.  T. H. JACOB  1,746,834
AUTOMOBILE DISPLAY DEVICE
Filed June 6, 1927   4 Sheets-Sheet 1
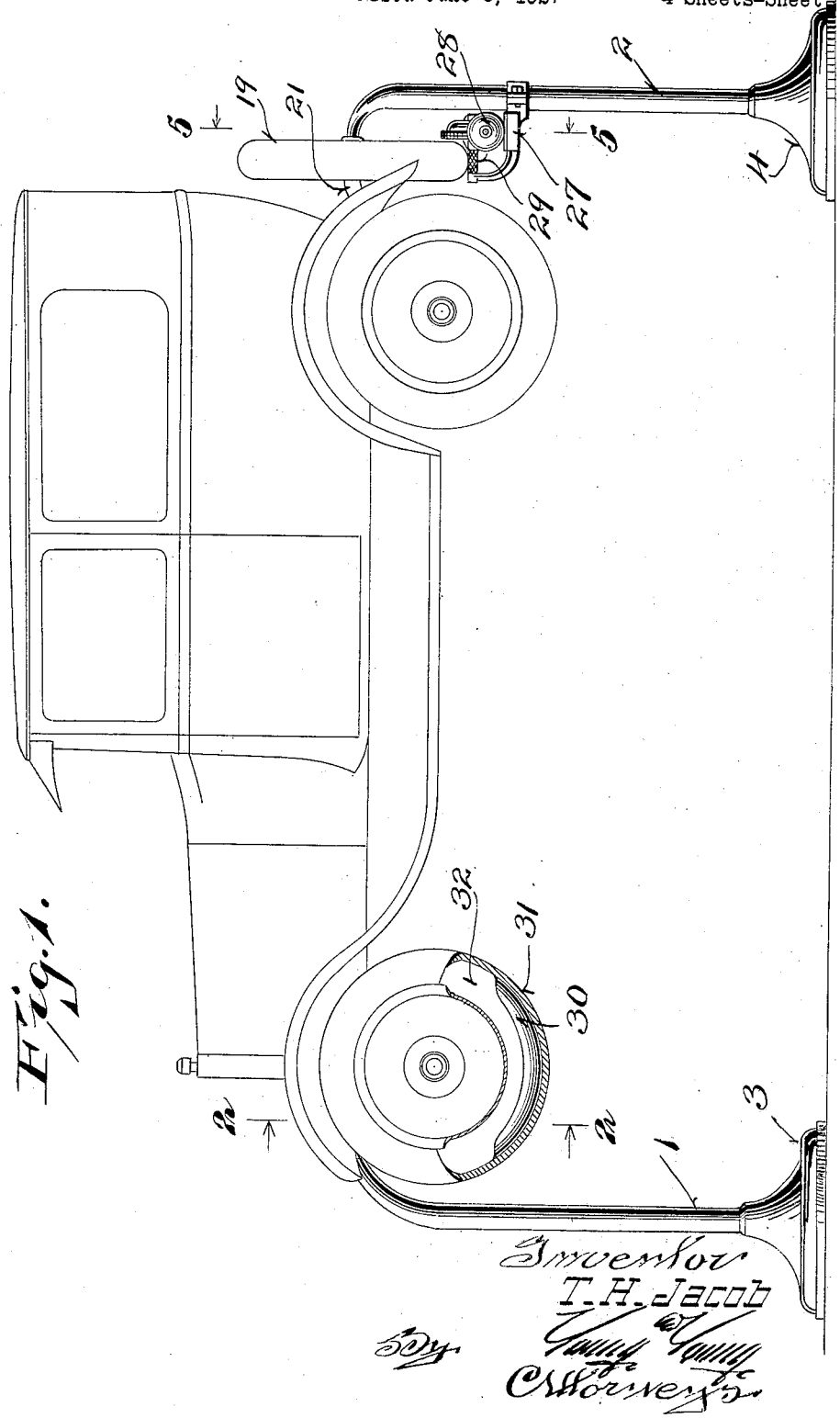

Feb. 11, 1930. T. H. JACOB 1,746,834
AUTOMOBILE DISPLAY DEVICE
Filed June 6, 1927 4 Sheets-Sheet 2
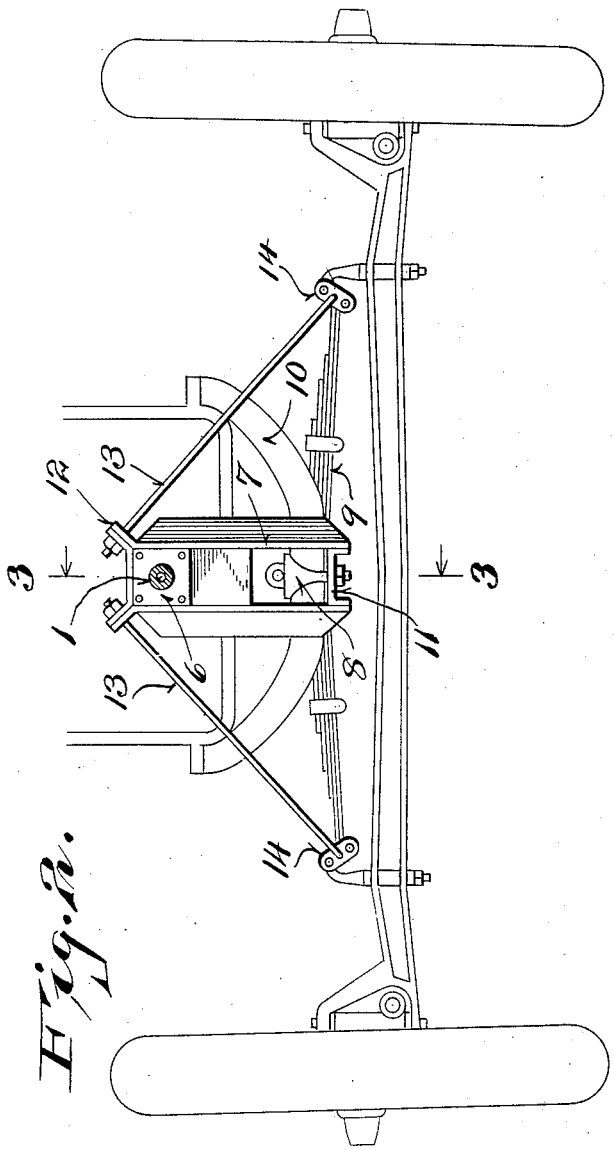
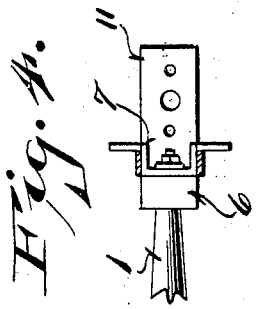
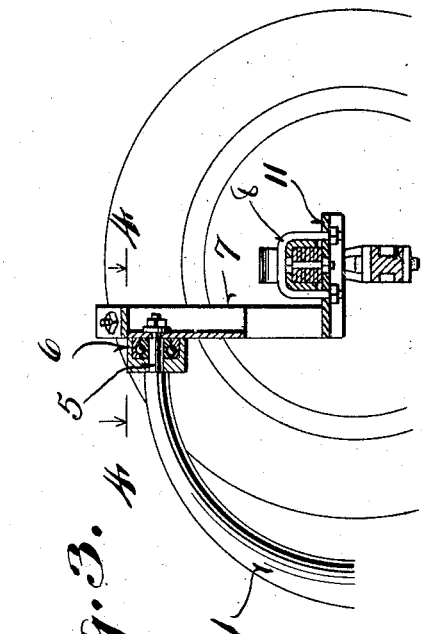

Feb. 11, 1930.　　　　T. H. JACOB　　　　1,746,834
AUTOMOBILE DISPLAY DEVICE
Filed June 6, 1927　　　　4 Sheets-Sheet 3

Inventor
T. H. Jacob
By
Attorneys

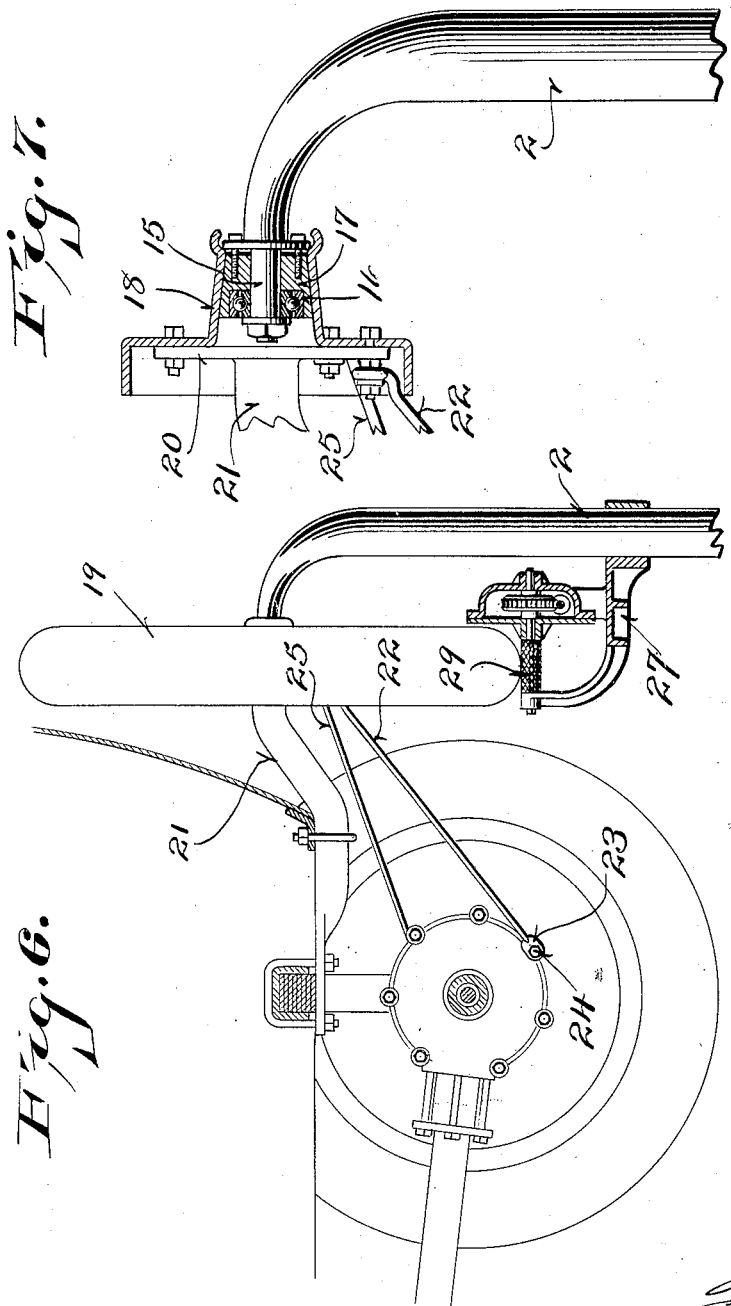

Patented Feb. 11, 1930

1,746,834

UNITED STATES PATENT OFFICE

THOMAS H. JACOB, OF WAUSAU, WISCONSIN

AUTOMOBILE DISPLAY DEVICE

Application filed June 6, 1927. Serial No. 196,876.

This invention relates to an automobile display device.

Objects of this invention are to provide a display device for automobiles which is so constructed that the automobile is rocked about a longitudinally extending axis so that it is slowly and continuously rotated to thus present all portions thereof to view.

Further objects are to provide a device in which simple forms of stands or standards are provided with bearing members which may be readily attached to the front and rear of an automobile to hold the car in a revolubly mounted or suspended position and to provide simple means for slowly rotating the car while in its suspended position.

Further objects are to provide a novel means for balancing a car with reference to the desired axis about which the car is rotated, such means being so associated with the car that they are not visible and do not detract from its appearance, but which may be adjusted to any desired degree to permit the complete and accurate balancing of any make of car so that it is not even necessary to rigidly secure the standards to the floor.

An embodiment of the invention is shown in the accompanying drawings in which:

Figure 1 is a side elevation of a car in suspended or revolubly mounted position with a portion of one of the tires broken away;

Figure 2 is a sectional view on the line 2—2 of Figure 1, however, showing the tires in full;

Figure 3 is a sectional view on the line 3—3 of Figure 2;

Figure 4 is a sectional view on the line 4—4 of Figure 3;

Figure 6 is a sectional view on the line 6—6 of Figure 5;

Figure 7 is a detailed sectional view through the rear square wheel support and the hub of the wheel, the remaining portions of the wheel being omitted.

Figure 5:
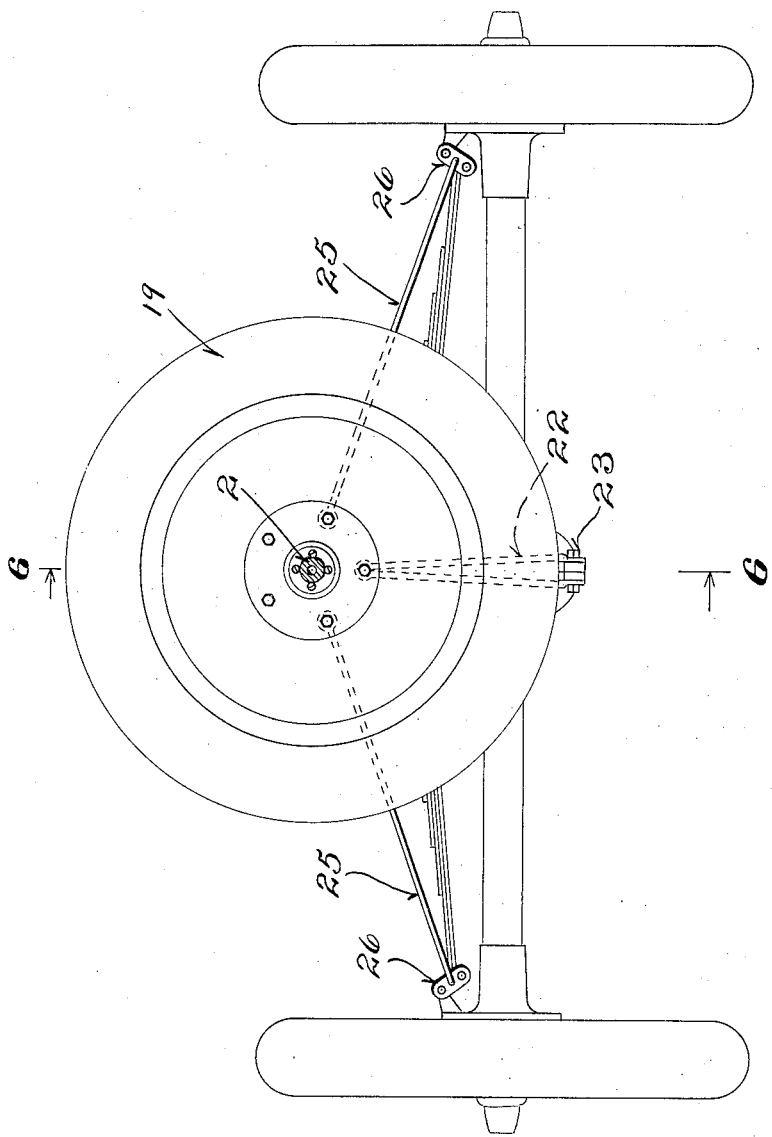
Figure 5 is a sectional view on the line 5—5 of Figure 1.

Referring to the drawings, it will be seen that the device comprises a front standard 1 and a rear standard 2, each of which is provided with an enlarged base, as indicated at 3 and 4. The balancing of the car is so perfect as a result of this invention that it has not been found necessary to secure the bases to the floor so that the devices are freely portable and may be set up in any display room or window without damage to the floors. Each of the standards is provided with an inwardly turned portion terminating in an axle, and the axles are aligned. For example, in reference to the front standard 1, it may be seen from Figure 3 that the inwardly turned portion terminates in the spindle 5 which fits within a roller bearing 6 rigidly bolted to a clamping bracket or member indicated generally by the reference character 7. This clamping bracket is provided with spaced portions between which a locking member 8 extends (see Figure 2). This locking-member passes over the front spring 9 and front support 10 of the automobile, as shown, and has its ends threaded and passed through the bottom plate 11 of the clamping bracket. Further, this clamping bracket is provided with outwardly turned ears 12 at its upper end through which tie rods 13 pass. These tie rods act as braces and are provided with outer feet 14 which correspond to the connecting links for the front springs and are held in place by the same bolts as those employed for such connecting links, as indicated in Figure 2. Thus, it will be seen that the front bearing member is rigidly attached to the automobile at its front portion in a simple and easy manner and is revolubly mounted upon the front axle.

The rear standard 2 is also inwardly turned and provided with an axle 15, as may be seen from Figure 7. This axle 15 carries a roller bearing 16 which in turn is carried by a conical block 17 fitted within the tapered portion 18 of the hub of the spare tire 19. This hub is bolted to the spare tire carrier plate 20 which, as is the usual practice, is carried by the bracket 21 secured to the rear portion of the automobile, as shown in Figures 6 and 7. Preferably, a pair of downwardly extending bracing rods 22 are secured to the plate 20 by one of the bolts which attaches the hub of the spare wheel, as shown in Figure 7. These bracing rods are provided with apertured feet 23 which are secured by one of the bolts 24 of the differential housing. Preferably, these rods 22 are integral and are looped at their upper portion where they are attached to the plate 20 (see Figure 5).

Further, it is to be noted that a pair of laterally extending bracing rods 25 are also provided and extend outwardly and terminate in feet 26, as shown in Figure 5, which are similar to the feet 14 previously described, and are attached to the spring supported links in the same manner. Thus, it will be seen that the rear support is rigidly braced and attached to the rear portion of the automobile.

Referring to Figure 1, it will be seen that a bracket 27 is adjustably carried by the rear standard 2 and carries a small electric motor 28 which is connected by reduction gearing with a knurled drum 29. This knurled drum is adapted to engage the spare tire 19 and to thus slowly rotate the automobile about the axis of the aligned axles of the standards. In order to perfectly balance any make of automobile with reference to the desired axis about which it is to be rotated, a plurality of arcuate weights 30 are positioned within the outer casings 31 of the tires, as shown in Figure 1, and are held in place by the inflated inner tubes 32. Thereafter the wheels are rotated to raise or lower the weights until the desired balance is accurately attained and thereafter the wheels are locked tightly to the automobile. Thus, it is possible to accurately balance any make of automobile without detracting from its appearance by means of these concealed weights. This permits the use of standards without any attachment to the floor, as there is no tendency to tilt, irrespective of the positions through which the automobile passes in its successive rotations.

It will be seen, therefore, that a novel display device for automobiles has been provided in which an automobile is slowly rotated about a longitudinal axis and all portions thereof are successively displayed.

It will be seen further that means have been provided for accurately balancing the automobile about this axis with the utmost ease and without detracting from its appearance.

It will be seen further that although the display device accomplishes the functions discussed above that nevertheless it is of extremely simple and practical construction, and is not unsightly, but lends itself very readily to the purpose for which it is designed.

Although the invention has been described in considerable detail, such description is intended as illustrative rather than limiting as the invention may be variously embodied and as the scope of such invention is to be determined as claimed.

I claim:
1. An automobile display stand comprising a pair of spaced uprights having bases adapted to loosely rest upon a floor and having inturned aligned axles, bearing blocks supported by said axles and adapted to be rigidly attached to the front and rear of an automobile, a wheel rigid with one of said bearing blocks, and means for rotating said wheel.

2. An automobile display stand comprising a pair of spaced uprights having bases adapted to loosely rest upon a floor and having inturned aligned axles, bearing blocks supported by said axles and adapted to be rigidly attached to the front and rear of an automobile, means for balancing the automobile about the axis of the aligned axles, a wheel rigid with one of said bearing blocks, and means for rotating said wheel.

In testimony that I claim the foregoing I have hereunto set my hand at Wausau, in the county of Marathon and State of Wisconsin.

THOMAS H. JACOB.